United States Patent [19]
Merritt, II

[11] Patent Number: 5,695,800
[45] Date of Patent: Dec. 9, 1997

[54] METHOD OF PREPARING A FOOD PRODUCT ENCASED IN A GLUCOMANNAN FILM

[75] Inventor: Frederick Maynard Merritt, II, Lockport, Ill.

[73] Assignee: Viskase Corporation, Chicago, Ill.

[21] Appl. No.: 615,352

[22] Filed: Mar. 13, 1996

[51] Int. Cl.⁶ .................................... A23L 1/31
[52] U.S. Cl. .................. 426/277; 264/186; 264/218; 426/105; 426/138
[58] Field of Search ........................ 426/105, 106, 426/129, 138, 513, 516, 276, 277, 278, 574; 264/186, 218, 233, 234, 236

[56] References Cited

U.S. PATENT DOCUMENTS

| | | | |
|---|---|---|---|
| 3,682,661 | 8/1972 | Turbak | 426/277 |
| 5,271,948 | 12/1993 | Boni et al. | 426/278 |

FOREIGN PATENT DOCUMENTS

| | | | |
|---|---|---|---|
| 273069 | 7/1988 | European Pat. Off. | 426/138 |
| 45-27378 | 9/1970 | Japan | 426/277 |
| 92-001394 | 2/1992 | WIPO | 426/138 |

OTHER PUBLICATIONS

"Edible Films and Coatings: A Review", J.J. Kester and D.R. Fennema, Dec. 1986—Food Technology, pp. 47–60.

Application Bulletin, FMC Corporation, pp. 1–4, undated.

R. L. Whistler and C. L. Smart, "Polysaccharide Chemistry", Glucomannans of Amorphopallus, Academic Press Inc., Publishers NY, 1953, pp. 302 and 303.

C. Ching, D. L. Kaplan, E. L. Thomas, "Biodegradable Polymers and Packaging", Technomic Publishing Co., Inc. 1993, pp. 16 and 362.

"Nutricol ® Konjac General Technology", 1993, pp. 1–8.

Primary Examiner—Joseph W. Drodge
Attorney, Agent, or Firm—Roger Aceto

[57] ABSTRACT

Disclosed is a food product encased in a water insoluble film of glucomannan and a method for its manufacture. In the process an aqueous solution of glucomannan is cast onto the food product surface and then is deacetylated and coagulated in sire by contact with a saturated salt solution having either an acidic or basic pH. The coagulated solution is cured and dried in the presence of salt and subsequently washed and further dried to provide the water insoluble film.

17 Claims, 1 Drawing Sheet

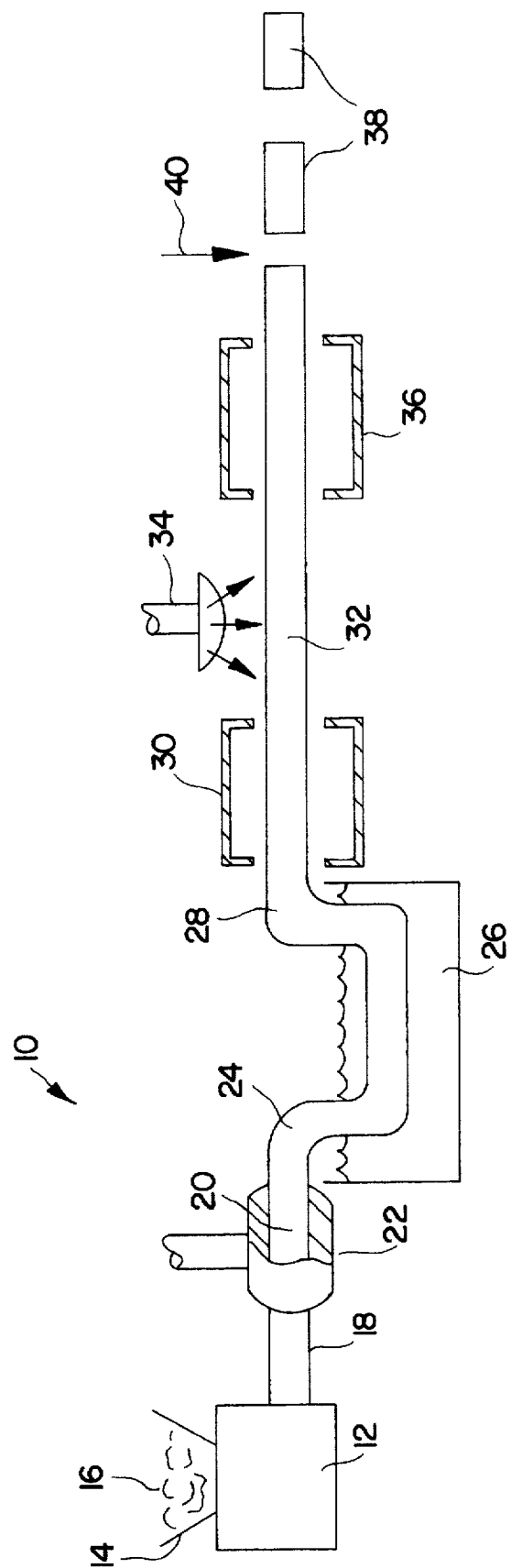

METHOD OF PREPARING A FOOD PRODUCT ENCASED IN A GLUCOMANNAN FILM

TECHNICAL FIELD

The present invention relates to a coextrusion process for the production of sausages and the like comprising an encased food product and more particularly to a method for coextruding a food product encased in a glucomannan film.

BACKGROUND

A conventional method for preparing encased food products such as sausages of all types and particularly fresh link sausages and frankfurters, involve stuffing the food product into a casing. The casing generally is made of a regenerated cellulose, collagen or is a natural casing. Some of these sausages are further processed such as by cooking or smoking by the sausage producer.

Attempts have been made to decrease reliance on the use of casings by extruding the food product without a casing or by processes and methods in which the food product and the casing are formed as a coextrusion. In one coextrusion process, as disclosed in U.S. Pat. No. 5,271,948, the extruded food product is encased in a collagen casing. In this method a slurry of collagen fibers and powdered cellulose which has been alkali treated and then acidified, is coextruded onto the surface of a fresh sausage emulsion. The collagen coated sausage is passed through a brine bath to set the collagen and then dried to produce a fresh link sausage. When the fresh link sausage subsequently is fried for consumption, the collagen coating remains intact on the cooked sausage.

In another coextrusion method, as disclosed in U.S. Pat. No. 3,885,053, a skin surface is formed on a protein food emulsion by maintaining it in contact with an edible acid solution for a time sufficient for the edible acid to react with the protein to form a cohesive skin surface on the emulsion.

The present invention provides an alternative coextrusion process to form a casing in situ on the surface of a food product using a polysaccharide derived from the tuberous corms of the Amorphophallus konjac plant as the casing forming material. The dried corms of the konjac plant contain about 30–50% of a polysaccharide called glucomannan. In the Orient, the tubers are dry-milled to produce a konjac flour used as a food source. The konjac flour has been put to a wide variety of uses such as in the manufacture of gels, films and coatings for food applications. For example, FMC Corporation provides a purified konjac flour under the trademark NUTRICOL®. This material is said to have film forming properties and literature provided by FMC describes a method for forming a NUTRICOL® konjac film. According to this method, one percent of the NUTRICOL® konjac is dispersed into an aqueous solution containing one percent glycerin. The dispersion is heated to 176°–185° F. (80°–85° C.), cast to a thin film and then air dried. The resulting film becomes gelatinous when rehydrated in cold water and is not suitable for applications in which the film is exposed to moisture. Thus, this method would not be suitable in applications where the coextrudate has a high moisture content as would be the case for example with a frankfurter meat emulsion or a fresh-link sausage such as a fresh pork sausage.

A stronger film which retains its integrity when placed in water can be obtained using the process described above and adding potassium carbonate to the heated NUTRICOL® konjac dispersion. This is because the glucomannan molecule of the konjac has acetyl groups in side branches and the potassium carbonate deacetylates the glucomannan so that the resulting film is less soluble. However, the suggested FMC process which involves use of a weak base to deacetylate the glucomannan and air drying is relatively slow and the resulting film still lacks sufficient strength to be used as a food casing even in a coextrusion application.

Accordingly, it is an object of the method of the present invention to provide a method of forming a food product encased in a glucomannan film formed in situ around the food product.

Another object of the present invention is to provide a method for forming a water insoluble glucomannan derived film on a food substrate such that the film forms a casing surrounding the food in a coextrusion process.

A further object of the present invention is to provide a method of forming a self supporting water insoluble film suitable for use as a food casing.

SUMMARY OF THE INVENTION

In the method of the present invention, a solution of glucomannan is cast directly onto a foodstuff such as an extruded frankfurter emulsion, fresh-link sausage or other extruded sausage meat. This is done either in a coextrusion operation or in a separate operation such that the glucomannan solution coats the sausage. The resulting coated food product then is treated in a manner which sets the glucomannan into a water insoluble film. In the case of a fresh-link sausage the casing remains intact during cooking of the sausage. In the case of a frankfurter emulsion, the casing remains intact for processing such as by smoking. If desired, the process for forming the casing also can include a cooking or smoking step which processes the food product.

The method of the present invention involves contacting the glucomannan coating on the food product with a bath containing a saturated salt solution. The salt solution acts to coagulate the glucomannan and form a gel. In addition, the bath includes an acid or a base so the pH of the salt solution is something other than neutral. A pH other than neutral is needed to rapidly deacetylate the glucomannan which renders it water insoluble. The pH for purposes of deacetylation can be either acidic or basic but it is preferred that the deacetyling agent be a strong base such as NaOH to increase the rate of deacetylation. Thus, the gel which is formed contains some of the bath components including both the salt and the deacetyating agent.

The resulting gel coated food article is heated to dry down and cure the gel. This forms the gel to a film which likewise contains some of the bath components. The drying step can be at a temperature sufficient to cook or partly cook the food product. The next step is a washing operation where the food article is showered or run through rinse water to wash out the bath components from the glucomannan film coating the food article. The article then is dried a second time. This second drying step also can involve the cooking or partial cooking of the food product such as by passing through a smoke house or other heated chamber.

While the invention primarily concerns forming a casing in situ about a food product which is coextruded with the casing, the invention also may be used to form a self supporting film of glucomannan. To form a self supporting film, it has been found that the glucomannan should be substantially sac-free. The glucomannan of the konjac tuber is contained in sacs. During processing of the tuber, such as by grinding, the sacs are ruptured so the glucomannan can be separated. It is usual for some amount of the sac residue, which is water insoluble, to remain in the glucomannan. While this insoluble residue does not prevent forming a glucomannan casing on the surface of a food product as set out above, the residue does appear to detract from the properties of a stand alone film. It is thought that the insoluble sac material remains as discrete particles in the film matrix and that this lowers physical properties such as tensile strength. Accordingly, for purposes of forming a stand alone film it is preferred that the glucomannan be substantially sac-free.

When this material is dissolved in hot water, there are little or no undissolved solids such as sac particles. The sac-free glucomannan solution is cast onto a support surface such as a glass plate (rather than on a food product) to form a thin aqueous film of the glucomannan solution. The film and support surface is passed through a high pH bath or an acid bath to deacetylate the glucomannan and render it insoluble. Preferably the bath is a saturated salt solution as this causes the glucomannan to coagulate and form a gel film that is coherent and removable from the support surface. Thereafter the coagulated gel film (which retains components such as salt and deacetylating agent from the bath) is dried, washed to remove the retained bath components from the film and dried again to form a stand alone film. For purposes of softening the film, it is preferred that it is passed through a polyol solution prior to the final drying step.

Thus, the present invention may be characterized in one aspect thereof by a method for preparing a food article including a foodstuff encased in a film of glucomannan comprising the steps of:

a) dissolving a konjac derived glucomannan flour in warm water to prepare an aqueous glucomannan solution;

b) extruding a foodstuff;

c) casting the aqueous glucomannan solution onto the surface of the foodstuff to encase it in a liquid film of the glucomannan solution;

d) contacting the liquid film of glucomannan solution on the surface of the foodstuff with a bath comprising a saturated salt solution having a pH other than neutral thereby deacetylating and coagulating the glucomannan solution to form a water insoluble glucomannan gel on the surface of the foodstuff and the gel retaining components from the bath;

e) drying the glucomannan gel on the surface of the foodstuff to form a dry glucomannan film containing the retained bath components;

f) washing the dry film to rinse out the retained bath components; and g) drying the rinsed glucomannan film thereby forming said food article.

DESCRIPTION OF THE FIGURE

The sole FIGURE is a schematic representation showing steps of a coextrusion process in accordance with the method of the present invention.

DETAILED DESCRIPTION OF THE INVENTION

Referring to the drawing, the FIGURE shows a system generally indicated at 10 for performing the method of the present invention in a coextrusion process. The system includes an extruder 12 having a hopper 14 for receiving a sausage composition 16. The extruder forces the sausage composition from the hopper and through a horn 18 to produce a conventional cylindrical sausage form indicated at 20.

As the sausage form exits the horn, an aqueous glucomannan solution is cast onto the surface of the sausage form 20. For example, the glucomannan solution can be extruded through a die 22 so a thin film (not shown) of the solution is applied to the surface of the sausage form 20. In this fashion there essentially is a coextrusion of the sausage composition and the aqueous glucomannan solution resulting in the solution-coated sausage article 24. As an alternative casting technique, the aqueous glucomannan solution can be applied to the surface of the sausage form by spraying onto the foodstuff surface or by dipping the extruded sausage form into the glucomannan solution. The glucomannan solution is relatively viscous so it remains in place about the surface of the extruded sausage form.

As a possible alternative, the glucomannan solution is injected into the horn 18 so it forms a thin layer between the inside surface of the horn and the surface of the extruded sausage.

After coextrusion (or otherwise casting the glucomannan solution onto the surface of the extruded sausage form) the solution-coated article 24 is passed into a bath 26 containing a saturated salt solution at a pH other than neutral. The pH can be either basic or acidic as either condition will result in the deacetylation of the glucomannan. However, it is preferred that NaOH be the deacetylating agent used in the solution as this strong base increases the rate of deacetylation. It has been found that a suitable salt solution is 26% NaCl and 0.5% NaOH which provides a saturated salt solution having a high pH.

The deacetylation of the glucomannan renders the glucomannan insoluble and the saturated salt in the bath coagulates the glucomannan so it forms a gel coating on the foodstuff surface. The gel coating, at this point, contains some of the bath components including salt and the base (or acid).

The gel-coated article 28 then leaves the salt bath and enters a drier 30. The primary purpose of drier 30 is to dry down the gel coating and set or cure the gel into a film. Drying the glucomannan gel while it contains the bath components has been found to improve the properties of the resulting film versus washing the gel to remove the retained bath components and then drying. A possible reason for this is that drying the film in the presence of the salt and the base (or acid) from the bath may provide a more complete cure of the film. In any event, only after leaving the drier 30, is the film 32 on the surface of the food article washed to remove the retained bath components. This can be done by any suitable means such as immersion or by passing the food article past a shower head 34. After the retained bath components have been removed, the wet film undergoes another drying step. This is illustrated in the FIGURE by showing the food article, now encased in the rewet glucomannan film passing through a second drier 36. This completes the process for encasing the foodstuff in a glucomannan film.

The resulting food article may be cut into links 38 as desired by a suitable severing means 40. Also it should be appreciated that complete or partial cooking of the foodstuff can occur in either of the driers 30 and 36 by maintaining the coated foodstuff in the drier for a time and at a temperature sufficient to cook or partially cook the foodstuff. For example either drier may include a smoking operation for processing the foodstuff within the glucomannan casing.

EXAMPLE 1

Tests were performed to demonstrate the usefulness of the method of the present invention for coextrusion purposes. In a coextrusion operation, as noted hereinabove, a sausage meat is extruded and simultaneously coated with a casing forming material or otherwise treated in order to set a skin or casing on the sausage form which aids in retaining the integrity of the sausage form during handling and cooking.

A first test used a konjac derived glucomannan flour sold by FMC Corporation under the name NUTRICOL®. The flour was found to contain about 7% of insoluble materials. These were considered to be the remnants of the sacs in the konjac tuber which contains the glucomannan.

A solution was prepared by mixing about 2.7% by weight of this glucomannan flour into water at about 60° C. by sifting into a vortex created by vigorously stirring the water. The mixture was then held at about 60° C. for about thirty minutes while continuing to stir at a less vigorous rate. The resulting solution was considered to be high molecular weight because at 60° C., a solution containing 2.7% of this flour had a viscosity of 150000 cps.

A fresh pork sausage of a type commonly sold at retail as a fresh link breakfast pork sausage was stripped of its collagen casing. A coextrusion process was simulated by rolling this sausage (stripped of its collagen casing) in the 60° C. glucomannan solution. This coated the solution onto the sausage surface. The solution-coated sausage was immersed in a saturated salt bath having a basic pH (26% NaCl/0.05% NaOH) for fifteen minutes to coagulate and deacetylate the glucomannan solution on the sausage surface. This formed a gel-like coating on the sausage. The sausage was hung on hooks in an oven at 85° C. for ten minutes to dry and cure the glucomannan coating. The sausage then was washed to rinse the retained bath components from the coating and was baked at 85° C. for about thirty to fifty minutes to insure a complete drying of the coating. The resulting product was indistinguishable from a control comprising a similar fresh pork sausage stuffed into a conventional collagen casing and baked in a similar fashion. In this respect, the glucomannan skin was tough and well adhered to the surface of the cooked sausage and the sausage surface was visually similar in color, gloss and texture to that of the sausages contained in the collagen casing.

This test as set out above was repeated only using about 2.5% of a glucomannan flour which contained little or no insoluble material, that is, the flour was substantially sac-free. The flour also was considered high molecular weight because at 80° C., the solution had a viscosity of about 78040 cps. The resultant product visually appeared indistinguishable from the fresh pork sausage with a collagen casing and the glucomannan casing on the sausage was tough and well adhered to the sausage surface.

These tests demonstrate the preferred method of the present invention wherein a glucomannan solution is cast onto the surface of a sausage and formed in situ to a casing which adheres to the sausage.

Several tests also were conducted attempting to form a stand alone film of konjac derived glucomannan flour. A first series of tests was conducted using a conventional konjac flour containing a portion of insoluble material (presumed to be sac remnants) and a second series of tests was conducted using sac-free konjac flour.

EXAMPLE 2

A glucomannan konjac flour obtained from FMC Corporation was determined to contain about 7% of water insoluble material (sac). The sac-containing flour was considered as having a high molecular weight because at 80° C., a 2.5% solution of this material has a viscosity of 84750 cps. For this Example 2, about 3% by weight of the flour was mixed into water at ambient temperature by sifting into a vortex created by vigorously stirring the water. The mixture was heated to a temperature of 80° C. and held at this temperature for about 30 minutes while continuing to stir at a less vigorous rate to insure as complete a dissolution as possible.

The solution at 80° C. was poured onto a flat glass plate heated to about 80° C. A bar, set to create a gap of 40 mils (1.02 mm) between it and the plate was drawn along the plate to spread or "draw" the solution across the plate. This formed a fluid coating of uniform thickness on the plate. The plate then was submerged into an ambient temperature bath consisting of a saturated salt solution having a basic pH. In particular the bath contained 26% NaCl and 0.5% NaOH. This deacetylated and coagulated the glucomannan so that after about 15 minutes, the fluid coating had coagulated to a coherent self supporting gel which separated from the glass plate.

The gel was secured on an embroidery hoop and washed in running temperate water for about 30 minutes to remove bath components which the gel had retained. It then was soaked in a 10% glycerin solution for about 10 minutes and dried in a forced air oven at 85° C. for 10 minutes. The tensile strength and elongation of the resulting film was determined both dry and after soaking in water to rewet the film. The results are given in Table I.

EXAMPLE 3

This example followed the procedure of Example 2 except that about 4% of a lower molecular weight sac-containing glucomannan konjac flour was used. At 24° C., a 4.6% solution had a viscosity of only 38000 cps. While the dry tensile strength of the resulting film is reported in Table I, the film, when rewet, was too weak to test so no rewet results are reported.

EXAMPLE 4

Another high molecular weight konjac flour and also containing about 7% of insoluble material was obtained. At 60° C., a 2.7% solution of this material has a viscosity of 150000 cps. The material was processed under the same conditions as Example 2 except that upon removal from the saturated salt bath, the gel film was dried prior to washing so the dried film contained some amount of the salt (NaCl) and base (NaOH) retained from the bath. After drying, the film was washed for about thirty minutes with running water to remove the retained bath components and dried at 85° C. in a forced air oven for about ten minutes. The resulting film which was about 1.5 mils (0.038 mm) thick had a dry tensile strength as reported in Table I but was too weak to test when rewet so no rewet results are given.

EXAMPLE 5

Another test was conducted using a glucomannan konjac flour which contained little or no insoluble material, that is, the glucomannan was substantially sac-free. The flour was a high molecular weight in that a 2.5% solution has a viscosity of about 78040 cps at 80° C. Film was made using the procedure and conditions of Example 4 in that the film was dried after removal from the salt bath, washed to remove salt and base and then dried a second time. In this fashion a film 0.4 mils (0.010 mm) thick was made. This film had a higher tensile strength than other konjac glucomannan films tested (1.32 kg/mm$^2$). The rewet tensile strength of this film also was higher than other films tested (0.1 kg/mm$^2$).

The process was repeated with the draw bar set at 80 mils (2.03 mm) which produced a dry film one mil thick (0.025 mm). Both the dry and the rewet tensile strength of this film were the highest of the films tested. The dry strength was 2.82 kg/mm$^2$ and the rewet tensile strength was 0.24 kg/mm$^2$.

EXAMPLE 6

For comparison to the conditions of Example 5, the same material as used in Example 5 was processed as in Example 2. In particular, the gel after removal from the saturated salt solution was washed to remove the retained salt and base and then dried. The resulting film had a dry tensile strength glucomannan film. However, it should be noted that tensile testing of this film occurred at a lower relative humidity (RH) than the other films. As a general rule, dry tensile strength increases as the RH decreases. Accordingly, it is likely that if this film had been tested at the same RH as the films of Examples 2–7, its dry tensile strength would be lower than the reported value. Moreover, in this test the cast film was washed prior to the first drying step (per the procedure of Example 2). Since the film had lower dry and rewet tensile strengths than the film of Example 5, it further demonstrates the benefit of drying the cast glucomannan solution prior to washing out the salt from the film.

TABLE 1

| Example | Mol. Wt. | Sac Free | Bath | Dry Film Thickness mils (mm) | Tensile kg/mm$^2$ Dry | Wet | Elongation To Break Dry | Wet |
|---|---|---|---|---|---|---|---|---|
| 2 | H | N | 26% NaCl and 0.5% NaOH | 1.5(0.038) | 0.57 | 0.09 | 85% | 0 |
| 3 | L | N | Same | 4.0(0.10) | 0.41 | XX | 37% | XX |
| 4 | H | N | Same | 1.5(0.038) | 0.14 | 0 | XX | XX |
| 5A | H | Y | Same | 0.4(0.010) | 1.32 | 0.1 | 5% | 0 |
| 5B | H | Y | Same | 1.0(0.025) | 2.82 | 0.24 | 5% | 187 |
| 6 | H | Y | Same | 2.0(0.05) | 0.3 | 0.02 | 71% | 0 |
| 7A | L | Y | Same | 0.4(0.010) | 0.44 | 0.1 | 0% | 0 |
| 7B | L | Y | Same | 2.0(0.05) | 0.9 | 0.34 | 4% | 119 |
| 8 | H | Y | 24% (NH$_4$)$_2$SO$_4$ 20% N$_2$SO$_4$ 4% H$_2$SO$_4$ | X | 2.2$^{(1)}$ | 0.05 | 4% | 0 |

X = Not measured
XX = Film too weak to test
$^{(1)}$ = Tested at lower relative humidity than other films. Lower RH increases dry tensile strength.

of only 0.3 kg/mm$^2$ and a rewet tensile strength of 0.02 kg/mm$^2$. As compared to Example 5, this demonstrates the improvement of drying the gel while it still contains an amount of salt and base from coagulating/deacetylating bath.

EXAMPLE 7

The test of Example 5 was repeated only using a sac-free glucomannan konjac flour of a lower molecular weight. A 3.8% solution of the flour had a viscosity of 38500 at 24° C. Films were made with the draw bar set at 40 mils (1.02 mm) and at 80 mils (2.03 mm) resulting in films having a dry thickness of 0.4 mils (0.01 mm) and 2 mils (0.05 mm) respectively. Both the dry and rewet tensile strengths of both films were higher than the films made using a process wherein the film from the saturated salt bath was washed prior to drying as in Examples 2–4.

EXAMPLE 8

The high molecular weight sac-free glucomannan konjac of Example 5 was used to prepare a 2.5% solution. The solution was cast to a film following the procedure of Example 2 except that the draw bar was set to 80 mils (2.03 mm) and the NaCl-NaOH bath was replaced with a nominally 24% ammonium sulfate/20% sodium sulfate/4% sulfuric acid bath. The film coagulated and separated from the glass plate in about five minutes. The dry film had a tensile strength of 2.2 kg/mm$^2$ and a rewet tensile strength of 0.05 kg/mm$^2$. This test demonstrated that a salt bath at an acid pH was suitable for coagulating and deacetylating the cast In reviewing the data of Examples 2–8, it is apparent that in general, films made of a sac-free glucomannan (Examples 5–8) had better tensile strength and elongation properties than films made of a sac-containing glucomannan. As used herein, sac-containing means that the glucomannan contains a portion of insoluble materials presumed to be remnants of the insoluble material forming the sacs in the konjac tubers which contain the glucomannan. A possible reason for the better tensile properties film made of the sac-free glucomannan is that the insoluble material are disruptions and weak spots in the glucomannan polymer matrix making up the film. Accordingly, a sac-free glucomannan is considered important for purposes of making a stand alone film. Examples 5 and 7 are considered preferred film embodiments since the method employed in making these films utilizes sac-free glucomannan, and the sequence of steps include contacting a cast film of the solution with a bath containing saturated salt solution and a base, drying the resulting coagulated and deacetylated gel and then washing out the salt and base.

In Example 6, the salt and base is washed from coagulated and deacetylated gel prior to drying. Comparing this film to the films of Examples 5 and 7 demonstrates that better tensile strengths of both a dry and rewet film are obtained if the gel is dried prior to washing out the salt and base.

Example 8 illustrates that coagulation and deacelytation can be accomplished using a saturated salt bath at an acid rather than basic pH. It should be noted, however, that Example 8 does not represent a preferred method of making the film since this film was made by rinsing the coagulated film prior to drying.

Thus it should be appreciated that the present invention accomplishes its intended objects in providing a food product encased in a water insoluble glucomannan film. The invention permits formation of the film in situ on the food product and thus has utility in a coextrusion operation which eliminates the need for a separate casing material into which the food product is stuffed. The invention further is adaptable to the formation of a stand alone glucomannan film.

It has been found that the method of contacting an aqueous glucomannan solution with a bath containing a saturated salt solution and base (or acid) to form an insoluble gel and then drying this gel in the presence of the bath components it retained enhances the curing of the film and unexpectedly improves the tensile and elongation properties of the resulting film.

Having described the invention in detail, what is claimed as new is:

1. A process for producing a glucomannan coated food product comprising the steps of:
   a) coextruding a food product and an aqueous glucomannan solution such that the glucomannan solution coats and adheres to the surface of the food product;
   b) contacting the coating with a saturated salt solution having a basic pH to deacetylate and coagulate the coating thereby forming a salt and base containing water insoluble glucomannan gel on the surface of the food product;
   c) curing the salt and base containing glucomannan gel at a temperature above ambient to form a glucomannan film;
   d) washing the glucomannan film to remove the salt and base; and
   e) drying the glucomannan film thereby forming a food product encased in a dry, water insoluble film composed of a deacetylated glucomannan.

2. A method as in claim 1 wherein the saturated salt solution includes 26% sodium chloride and 0.5% sodium hydroxide.

3. A method for preparing a food article including a foodstuff encased in a glucomannan film comprising the steps of:
   a) dissolving a konjac-derived glucomannan flour in warm water to form an aqueous glucomannan solution;
   b) casting the aqueous glucomannan solution on to a foodstuff to form an aqueous coating on the surface of the foodstuff;
   c) contacting the aqueous coating with a saturated salt solution having a pH other than neutral for deacetylating and coagulating the aqueous coating with the salt solution to form a water insoluble salt-containing glucomannan gel on the foodstuff surface;
   d) drying the salt-containing glucomannan gel to form a dry salt-containing glucomannan film on the foodstuff surface;
   e) washing the film on the foodstuff surface to rinse the salt from the film; and thereafter
   f) drying the washed film on the foodstuff surface.

4. A method as in claim 3 wherein the saturated salt solution has a basic pH.

5. A method as in claim 4 wherein the saturated salt solution comprises sodium chloride and sodium hydroxide.

6. A method as in claim 5 wherein the saturated salt solution comprises 26% sodium chloride and 0.5% sodium hydroxide.

7. A method as set out in claim 3 wherein at least one of said drying steps is conducted under conditions of time and temperature sufficient to at least partly cook said foodstuff.

8. A method as set out in claim 3 wherein said dissolving step to form the glucomannan solution is prepared by stirring about 2–7% by weight of a konjac-derived glucomannan flour containing about 7% of water insoluble material into 60° C. water.

9. A method as set out in claim 8 wherein said glucomannan solution has a viscosity of about 150000 cps at 60° C.

10. A method as set out in claim 3 wherein said glucomannan solution is prepared by stirring into 60° C. water about 2.5% by weight of a konjac-derived glucomannan flour which is substantially free of water insoluble materials.

11. A method as in claim 10 wherein the glucomannan solution has a viscosity of about 78040 cps at 80° C.

12. A method as set out in claim 3 wherein the foodstuff is an uncooked pork sausage and said casting of the glucomannan solution onto the surface of the foodstuff is accomplished by moving the pork sausage through the glucomannan solution.

13. A method as set out in claim 3 wherein at least one of said drying steps is conducted at a temperature of about 85° C.

14. A method as in claim 3 wherein the saturated salt solution has an acidic pH.

15. A method as in claim 14 wherein the saturated salt solution includes 24% ammonium sulfate, 20% sodium sulfate and 4% sulfuric acid.

16. A method as in claim 3 wherein the temperature of at least one of said drying steps is 80° C.

17. A method as in claim 3 wherein casing the aqueous glucomannan solution onto the foodstuff is accomplished by coextruding said foodstuff and glucomannan solution such that the glucomannan solution coats and adheres to the surface of said foodstuff.

* * * * *

UNITED STATES PATENT AND TRADEMARK OFFICE
CERTIFICATE OF CORRECTION

PATENT NO. : 5,695,800
DATED : DECEMBER 9, 1997
INVENTOR(S) : FREDERICK MAYNARD MERRITT, II

It is certified that error appears in the above-identified patent and that said Letters Patent is hereby corrected as shown below:

(57) ABSTRACT, LINE 5, DELETE "IN SIRE" AND INSERT --IN SITU--

Signed and Sealed this

Fourteenth Day of April, 1998

Attest:

BRUCE LEHMAN

Attesting Officer

Commissioner of Patents and Trademarks